United States Patent [19]

Sacco et al.

[11] Patent Number: 5,897,548
[45] Date of Patent: Apr. 27, 1999

[54] METHOD FOR REDUCING FOAM IN A BLOOD SUBSTANCE AND ANTIFOAMING AGENTS

[75] Inventors: Silvio Sacco, Coggiola; Giampero Porro, Como; Stefano Rinaldi, Parma; Leopoldo Della Ciana, Lugo, all of Italy

[73] Assignee: Dideco S.p.A., Mirandola, Italy

[21] Appl. No.: 08/744,497

[22] Filed: Nov. 7, 1996

[30] Foreign Application Priority Data

Nov. 17, 1995 [IT] Italy .................................. TO95A0921

[51] Int. Cl.$^6$ .............................. A61M 1/34; B01D 19/04
[52] U.S. Cl. ........................... 604/405; 516/133; 604/403
[58] Field of Search ................... 252/321, 358; 604/403, 405; 210/645

[56] References Cited

U.S. PATENT DOCUMENTS

| | | | |
|---|---|---|---|
| 3,113,930 | 12/1963 | Chevalier | 252/358 |
| 3,652,453 | 3/1972 | MacDonnell | 252/358 |
| 3,661,793 | 5/1972 | Curtis | 252/321 |
| 4,451,390 | 5/1984 | Flannigan | 252/321 |

FOREIGN PATENT DOCUMENTS

| | | | |
|---|---|---|---|
| 0 049 461 B1 | 4/1982 | European Pat. Off. | |
| 0 076 558 B1 | 4/1983 | European Pat. Off. | |
| 0253467 | 1/1988 | European Pat. Off. | 604/405 |
| 0 630 656 A1 | 12/1994 | European Pat. Off. | |
| WO 92/21387 | 12/1992 | WIPO | |
| WO 94/12605 | 6/1994 | WIPO | |

OTHER PUBLICATIONS

Naim et al., "The Adjuvant Effect of Silicone–gel on Antibody Formation in Rats," *Immunological Investigations*, 22(2):151–161 (1993).

Chang, "Adjuvanticity and Arthritogenicity of Silicone," *Plastic and Reconstructive Surgery*, 92(3):469–473 (1993).

Vardar–Sukan, "Efficiency of Natural Oils as Antifoaming Agents in Bioprocesses," *J. Chem. Tech. Biotechnol.*, 43(1):39–47 (1988).

*Primary Examiner*—Richard D. Lovering
*Attorney, Agent, or Firm*—Popovich & Wiles, P.A.

[57] ABSTRACT

A method for reducing foam in a blood substance comprising contacting at least a portion of the blood substance with a contact-generating substrate which comprises an antifoaming agent, wherein the antifoaming agent comprises a triglyceride of one or more saturated or unsaturated $C_{14}$–$C_{24}$ fatty acids or a mixture of triglycerides having one or more saturated or unsaturated $C_{14}$–$C_{24}$ fatty acids, wherein the triglyceride or mixture of triglycerides has a hydrophilic-lipophilic balance of from 5 to 10.

14 Claims, No Drawings

METHOD FOR REDUCING FOAM IN A BLOOD SUBSTANCE AND ANTIFOAMING AGENTS

FIELD OF THE INVENTION

The present invention relates to a method of reducing foam and/or cloudiness in a blood substance and to antifoaming agents for reducing foam and cloudiness in a blood substance. This method and these antifoaming agents are particularly useful in blood treatment and handling techniques such as oxygenation, auto-transfusion, plasmaphoresis techniques, and extracorporeal circulation in general.

BACKGROUND OF THE INVENTION

The formation of foam in extracorporeal circulation circuits (E.C.C.'s) takes place mainly in the return from the surgical aspirators to the cardiotomy reservoir as a result of the forced blowing of air into the blood. It is thought that the formation of the foam is primarily caused by the high concentration of albumin, about 30 to 40 mg/ml, present in the blood. The foam formation occurs as a result of the agitation of the blood and air in the presence of albumin which acts as a stabilizing agent.

The destruction of foam in blood-treatment devices is currently carried out with the use of silicone compounds such as antifoaming compound A (Dow Coring), which is an emulsion of silicone oil and; silica.

Recent investigations of silicone oil, particularly for use in mammary prostheses, has caused a sensitization of public opinion with regard to the use of silicone in the biomedical field. Although no carcinogenic activity of silicone either in the form of oil or as a gel has been found, some effects on the immune system have been found. In particular, an adjuvant effect of silicone on the immune system has been found. See Chang, *Plastic and Reconstructive Surgery*, Vol. 92, No. 3, pp. 469–473 (1993); and Naim et al., *Immunological Investigations*, Vol. 22, No. 2, pp. 151–161 (1993).

The primary object of the present invention is to identify a method of reducing foam in blood which, while maintaining the foam-reducing performance achievable by the use of silicone antifoaming agents, does not involve the addition to the blood of agents which are not completely biocompatible or haemocompatible.

Foam-reducing methods based on physical-mechanical devices are known; these devices can be inserted directly in the venous reservoir and/or in the cardiotomy reservoir. Some examples are:

(a) micro-channels formed by machining on the surface of plastics materials such as, for example, Teflon, polycarbonate, Delrin, PVC;

(b) filtering fabrics of Dacron and Teflon;

(c) metal combs or machined steel and titanium surfaces; and (d) silicone elastomer coating of the polyurethane foam of the venous reservoir.

Chemical-physical destruction systems based on the use of antifoaming agents which can inhibit the formation of foam or can reduce the amount of foam without inhibiting its formation are also known.

Among the antifoaming agents, in addition to the antifoaming agent sold under the tradename compound A, already mentioned, surfactants belonging to the polyalkylene oxides class (such as the compounds sold under the tradename PLURONIC), amides and sulphonic compounds of long-chain alkenes, perfluoroethers and polyether polyols are known.

The article by Vardar-Sukan published in *J. Chem. Tech. Biotechnol.*, Vol. 43, pp. 39–47 (1988) reports research relating to the effectiveness of natural oils as antifoaming agents in bioprocesses. In particular, in this article, the effectiveness of natural oils as antifoaming agents in substrates constituted by aqueous solutions of soya flour and sugar beet, which simulated fermentation media, was investigated. The effectiveness of various natural oils as antifoaming agents in these substrates was investigated, with the natural oils being added in concentrations variable between 0.2 and 1%. The conclusion was that effectiveness varies greatly in dependence on the substrate.

In view of the relatively high concentrations with which a satisfactory foam-suppression effect was achieved in the Vardar-Sukan article, it had to be considered that the use of these agents could not be contemplated for destroying foam in blood because, in this case, the release of the agent into the blood necessarily has to be kept to minimal levels.

Surprisingly, as a result of the present invention, it has been found that fatty acid triglycerides have a suppressant effect on foam in the blood and its derivatives equivalent to that of the conventional antifoaming agents used for this purpose when they are impregnated or bound to a contact-generating substrate which contacts a blood substance.

SUMMARY OF THE INVENTION

The invention provides a method for reducing foam in a blood substance comprising contacting at least a portion of the blood substance with a contact-generating substrate which comprises an antifoaming agent, wherein the antifoaming agent comprises a triglyceride of one or more saturated or unsaturated $C_{14}$–$C_{24}$ fatty acids or a mixture of triglycerides having one or more saturated or unsaturated $C_{14}$–$C_{24}$ fatty acids, wherein the triglyceride or mixture of triglycerides has a hydrophilic-lipophilic balance (HLB) of from 5 to 10.

The invention also provides an antifoaming composition for reducing foam in a blood substance comprising a dispersion of: (a) a triglyceride of one or more saturated or unsaturated $C_{14}$–$C_{24}$ fatty acids or a mixture of triglycerides, wherein the triglyceride or mixture of triglycerides has a hydrophilic-lipophilic balance of from 5 to 10; and (b) a hydrophobic filler having a particle size of from 0.001 $\mu$m to 0.05 $\mu$m. The invention also provides a polyurethane foam having a porosity of from 10 ppi to 40 ppi soaked or coated with an antifoaming agent of the invention. The invention further provides a device for treating, transporting, or storing blood comprising a porous substrate soaked, coated, or impregnated with an antifoaming agent of the invention.

Additional features and advantages of the invention are set forth in the description which follows and in part will be apparent from the description. The objectives and other advantages of the invention will be realized and attained by the method of reducing foam in a blood substance and the antifoaming agents and their uses as particularly pointed out in the written description and claims.

It is to be understood that both the foregoing general description and the following detailed description are exemplary and explanatory and are intended to provide further explanation of the invention as claimed.

DETAILED DESCRIPTION OF THE INVENTION

The invention provides a method for reducing foam in a blood substance comprising contacting at least a portion of the blood substance with a contact-generating substrate which comprises an antifoaming agent, wherein the antifoaming agent comprises a triglyceride of one or more saturated or unsaturated $C_{14}$–$C_{24}$ fatty acids or a mixture of triglycerides having one or more saturated or unsaturated $C_{14}$–$C_{24}$ fatty acids, wherein the triglyceride or mixture of triglycerides has a hydrophilic-lipophilic balance of from 5 to 10.

In the following description and claims, the term blood substance is intended to include both whole blood and its components and derivatives. All of these blood substances form foam and/or cloudiness when subjected to handling in the presence of air. The term triglyceride of fatty acids is intended to include both glycerine esters with a single type of fatty acid and mixed esters.

The HLB parameter is determined by the balance between the hydrophilic and lipophilic (hydrophobic) portions of the molecule in question. The numerical HLB values for the various functional groups are tabulated in the literature and the empirical HLB value for a given molecule is calculated by the addition of 7 to the algebraic sum of the numerical values of the HLB's of the functional groups. The least hydrophilic surfactants have low HLB numbers and increasing HLB numbers correspond to increasing hydrophilic character.

In a preferred embodiment of the invention, the blood substance is selected from whole blood, blood components, or blood derivatives. In another preferred embodiment, the one or more fatty acids of the triglyceride are selected from ricinoleic acid, oleic acid, linoleic acid, linolenic acid, palmitic acid, or stearic acid.

In one embodiment of the invention, the antifoaming agent is a dispersion and the antifoaming agent comprises a hydrophobic filler. The hydrophobic filler preferably has a particle size of from 0.001 µm to 0.05 µm. The concentration of hydrophobic filler in the dispersion preferably is from 1 to 10% by volume relative to the triglyceride or mixture of triglycerides. The hydrophobic filler preferably is pyrolysis silica which has been rendered hydrophobic with siloxanes and/or silanols.

In a preferred embodiment, the triglyceride or mixture of triglycerides comprises castor oil. In another embodiment, the triglyceride or mixture of triglycerides comprises at least 80% by weight of ricinoleic acid triglyceride. In another preferred embodiment, the triglyceride or mixture of triglycerides consists essentially of castor oil.

The dispersion of antifoaming agent and filler preferably is applied to the contact-generating substrate with the use of a vehicle preferably constituted by a biocompatible solvent which, after impregnation of the substrate, is removed, for example, by evaporation. In one embodiment, the contact-generating substrate is formed by applying the antifoaming agent to the contact-generating substrate in a solvent and then evaporating the solvent. In a preferred embodiment, the solvent is isopropyl alcohol, and wherein the concentration of the antifoaming agent, including any hydrophobic filler, relative to the solvent is in the range of from 10 to 40% by volume. The contact-generating substrate preferably is a polyurethane foam.

The invention also provides an antifoaming agent for reducing foam in a blood substance comprising a dispersion of: (a) a triglyceride of one or more saturated or unsaturated $C_{14}$–$C_{24}$ fatty acids or a mixture of triglycerides having one or more saturated or unsaturated $C_{14}$–$C_{24}$ fatty acids, wherein the triglyceride or mixture of triglycerides has a hydrophilic-lipophilic balance of from 5 to 10; and (b) a hydrophobic filler. The hydrophobic filler preferably has a particle size of from 0.001 µm to 0.05 µm. In a preferred embodiment, the concentration of hydrophobic filler is from 1 to 10% by volume relative to the triglyceride or mixture of triglycerides. In another embodiment, the hydrophobic filler is pyrolysis silica which has been rendered hydrophobic with siloxanes and/or silanols. In another embodiment, the triglyceride or mixture of triglycerides comprises castor oil. In another embodiment, the triglyceride or mixture of triglycerides comprises at least 80% by weight of ricinoleic acid triglyceride. In another preferred embodiment, the triglyceride or mixture of triglycerides consists essentially of castor oil.

The invention provides a polyurethane foam having a porosity of from 10 ppi to 40 ppi soaked or coated with an antifoaming agent of the invention.

The invention also provides a device for treating, transporting, or storing blood comprising a porous substrate soaked, coated, or impregnated with an antifoaming agent of the invention. In preferred embodiments, the device is selected from a cardiotomy reservoir, venous reservoir, or combined cardiotomy and venous reservoir. The device may also be a blood filter.

The use of the triglyceride of ricincoleic acid and of mixtures of this triglyceride with triglycerides of other fatty acids, in which the concentration of the triglycerides of ricinoleic acid is preferably greater than 80% by weight is preferred.

Natural or synthetic castor oil, such as castor oil F.U. (Farmacopea Ufficiale—official phannacopoeia) or the polyol PUR 634B (Morton International) monomer used in the production of polyurethane and constituted essentially by castor oil, are advantageously used as a foam suppressant within the scope of the invention.

Castor oil F.U. is generally 90% pure, the remainder being constituted by a mixture of saturated and unsaturated $C_{14}$–$C_{24}$ acids amongst which oleic acid (7–8%) and linoleic acid (3–5%) predominate, with small concentrations of the order of 2–3% of saturated fatty acids.

Castor oil, like all unsaturated triglycerides, has a natural predisposition to react with the oxygen in the air; the process is accelerated by various chemical catalysts, by light, and by heat. To prevent this type of reaction, castor oil is normally mixed, during the production process, with anti-oxidants such as phenols and amines.

The triglyceride or mixture of triglycerides and fatty acids used in the present invention may thus include small concentrations of antioxidants of the type specified above, although in concentrations so as not to have a negative effect on the biocompatibility of the antifoaming agent.

Amongst the hydrophobic particles usable within the scope of the invention, silica aerogel, aluminum or titanium oxide, pyrogenic silica, and micro-particles of polymers such as polyethylene and PTFE may be mentioned.

The use of pyrolysis silica marketed, for example, under the tradename Aerosil R/972 is particularly preferred. This filler is constituted by substantially spherical particles preferable having an average diameter of between 0.007 and 0.04 Rm. These particles preferable have a smooth surface without pores and are rendered hydrophobic by means of surface-bonded siloxane and silanol groups.

The concentration of the hydrophobic filter in the dispersion of antifoaming agent and hydrophobic filler is preferable from 1 to 10%, most preferable from 4 to 6%, by volume relative to the triglyceride or mixture of triglycerides.

The contact-generating substrate, soaked, coated or impregnated with the antifoaming agent of the invention is generally constituted by an open-cell polyurethane foam of the type commonly used in cardiotomy reservoirs, venous reservoirs, and combined cardiotomy and venous reservoirs. In some cases, the polyurethane foam separates the cardiotomy and venous reservoirs. Other porous substrates such as non-woven fabrics, felts, and the like may be used.

The first step in a method of preparing the antifoaming agent comprises mixing the filler into the triglyceride. In the second step, the mixture of filler and triglyceride is dispersed in the solvent to produce the composition for impregnating the porous substrate. When the hydrophobic filler is silica, which has a high volatility and is therefore difficult to handle, it is preferable to carry out a first mixing of the triglyceride with the silica in a much higher ratio of silica/castor oil than will be used and then add more triglyceride until the desired silica/castor oil ratio is obtained.

EXAMPLE

To prepare the antifoaming agent, castor oil was used as the triglyceride and the product Aerosil R/972 (Degussa Italia) as the filler. The castor oil used was both the F.U. pharmaceutical product and Morton International's PUR SYSTEM 634B polyol, which consists essentially of castor oil.

The castor oil and the silica were mixed in a mortar in a ratio of 1:1 (v/v) to produce a homogeneous dispersion.

The mixture obtained by the dispersion of the silica in the castor oil was degassed, for example under vacuum, in order to eliminate completely the air bubbles trapped during the previous step.

The silica/castor oil ratio of 5% by volume was reached by the dilution of the previously prepared concentrated emulsion with castor oil.

The emulsion obtained by the dispersion of the silica in castor oil was then used to prepare a 1:5 (v/v) solution in isopropanol. The solution obtained was then used directly for the impregnation of polyurethane foam.

Foams with a porosity of from 10 to 40 ppi (pores per inch) were preferably used.

The foams were advantageously washed with Freon or another solvent and were then impregnated by immersion in the antifoaming agent previously prepared with immersion times of the order of about 5 minutes, under static conditions. Upon completion of the impregnation, the foams were washed with isopropanol in two successive steps for a total time of about 5 minutes. Upon completion of the rinsing, the foams were dried in an oven at 70° C. for about 15 minutes.

The foam-impregnation process described above enabled a reproducible quantity of antifoaming agent to be deposited on the polyurethane foam. Checking was carried out by the weighing of standard SORIN production samples of polyurethane foam (17.5 cm×14 cm×10 mm) of 30 and 20 ppi before and after treatment. The following quantities of antifoaming agent deposited on the foams were obtained by averaging the differences in the weight of the samples before and after the foam-impregnation process:

30 ppi foam: 0.8 g±0.2 g 20 ppi foam: 0.7 g±0.2 g

As can be seen from the following tests, the method of preparing the foams with impregnation of the antifoaming agent by immersion was also particularly satisfactory in relation to wash-out tests. However, other methods of bonding the antifoaming agent to the porous substrate may be used. For example, cross-linking of the triglyceride (polyol) to the foam by means of isocyanate may be used to bond the antifoaming agent to the porous substrate.

Test Methods

The performance of the novel antifoaming agent was checked by means of a series of comparison tests with the use of a SORIN VRF 40 Hard Shell Venous Reservoir with Integral Cardiotomy Filter, which includes a cardiotomy reservoir separated from the venous reservoir by the polyurethane foam. The polyurethane foam of the cardiotomy reservoir of a SORIN VRF 40 was treated with the antifoaming agent of the invention described above and the polyurethane foam of the cardiotomy reservoir of another SORIN VRF 40 (the control reservoir) was treated with antifoaming compound A (Dow Coming).

Functionality Test

The operation of the devices treated with the antifoaming agent of the invention described above was checked by the use of an experimental system in which the reservoir being tested and the control reservoir were supplied in parallel by means of a peristaltic pump in closed circuit with heparinated bovine blood.

First, the devices were checked under normal conditions by a comparison of the effectiveness of the antifoaming agent and a functionality check of the device was then carried out under extreme conditions by the supply of the test circuit with a very high air flow and comparison of the behavior with a production reservoir. For this purpose, the test circuit was provided with a flow-meter which could supply the two circuits with equal and metered parallel air flows upstream of the peristaltic pump and downstream of the reservoir under test and downstream of the control reservoir, respectively.

The functionality test of the devices under normal operative conditions was carried out with a flow-rate of the etracorporeal circulation peristaltic pump of 3 l/min. for a period of 60 minutes. No differences between the operation of the test device and the control device were found.

A functionality test in forced operative conditions was carried out with a flow rate of the E.C.C. pump of 3 l/min. for a period of 4 hours with the supply of an air-flow into the two parallel circuits of 0.15 l/min. without any difference being noted between the operation of the two devices.

A test of the endurance of the devices under normal operative conditions was carried out with a flow-rate of the E.C.C. pump of 3 l/min. with a test duration of 6 hours without interruption, again without any differences being noted between the operation of the two devices.

Biocompatibility Tests

The biocompatibility tests were carried out by means of subcutaneous irritation tests and systemic toxcity tests carried out on the castor oil F.U. and castor oil polyol (Morton International's PUR SYSTEM 634B polyol). These tests showed no subcutaneous irritation or systemic toxicity reaction.

Further biccompatibility tests were carried out on the eluate derived from the SORIN reservoir treated with the antifoaming agent of the invention described above. In particular, the cytotoxicity test, mutagenesis test, and allergic sensitization and haemolysis tests showed no harmful or potentially harmful effects.

Release Tests

Upon completion of the checking of the performance of the antifoaming agent according to the invention described above in comparison with conventional antifoaming agents, the quantity of castor oil which could be released into the blood during E.C.C. was checked. As is known, precisely because of the wash-out of the silicone oil (antifoaming compound A) from the polyurethane foam, problems may be caused by the accumulation of the antifoaming agent in the blood because of the difficulty with which this substance is metabolized in the organism.

On the basis of these considerations, the actual wash-out of the antifoaming agent (castor oil) during E.C.C. was checked in bovine blood to ascertain the capacity for metabolization of the substance released. The tests of the release of the antifoaming agent (castor oil) into bovine blood were carried out under the following conditions. The experimental set-up was an extracorporeal circulation circuit in connection with a SORIN reservoir fill of blood. The sample was a SORIN reservoir with a polyurethane foam treated with antifoaming agent (castor oil) as in the preceding Example. The extracorporeal circuit contained 3 liters total of bovine blood at a flow rate of 3 liters/min. The duration of the experiment was 6 hours without interruption. The test for measurement of the triglycerides in the blood was the Boehringer GPO-PAP colorimetric enzymatic test.

The experimental results of the test carried out on the blood were very satisfactory as shown in the following table:

| Sample | mg/dl | time (min) | total mg |
| --- | --- | --- | --- |
| 1 | 0.82 | 0.00 | 24.6 |
| 2 | 2.1 | 15.0 | 63.0 |
| 3 | 1.57 | 30.0 | 47.1 |
| 4 | 2.18 | 60.0 | 65.4 |
| 5 | 1.94 | 90.0 | 58.2 |
| 6 | 2.98 | 120.0 | 89.4 |
| 7 | 3.8 | 180.0 | 114.0 |
| 8 | 3.84 | 240.0 | 115.2 |
| 9 | 4.59 | 300.0 | 137.5 |
| 10 | 4.75 | 360.0 | 142.5 |

A curve of the release of castor oil into blood derived from the experimental data identified 0.30 mg/min. as the quantity of antifoaming agent washed out during E.C.C. It is clear from these data that the total theoretical quantity of castor oil which can be found in the blood after a 6-hour E.C.C. is equal to 110 mg with a release rate of 0.3 mg/min.

If taken into account that castor oil, like other triglycerides of the invention, can be metabolized by the human organism during actual tests in vivo, an accumulation of the substance as found in the ex vivo experiment would not be possible.

The above description and accompanying drawings are provided for the purpose of describing embodiments of the invention and are not intended to limit the scope of the invention in any way. It will be apparent to those skilled in the art that various modifications and variations can be made in the method of reducing foam in a blood substance and the antifoaming agents and their uses without departing from the spirit or scope of the invention. Thus, it is intended that the present invention cover the modifications and variations of this invention provided they come within the scope of the appended claims and their equivalents.

What is claimed is:

1. A method for reducing foam in a blood substance comprising contacting at least a portion of the blood substance with a contact-generating substance which comprises an antifoaming agent, wherein the antifoaming agent comprises:

(a) a triglyceride component comprising castor oil; and (b) a hydrophobic filler.

2. A method according to claim 1, wherein the blood substance is whole blood, blood components, or blood derivatives.

3. A method according to claim 1, wherein the hydrophobic filler has a particle size of from 0.001 μm to 0.05 μm.

4. A method according to claim 1, wherein the concentration of hydrophobic filler in dispersion is from 1 to 10% by volume relative to the triglyceride component.

5. A method according to claim 1, wherein the hydrophobic filter is pyrolysis silica which has been rendered hydrophobic with siloxanes and/or silanols.

6. A method according to claim 1, wherein the triglyceride component consist essentially of castor oil.

7. A method according to claim 1, wherein the contact-generating substrate is formed by applying the antifoaming agent to the contact-generating substrate in a solvent and then evaporating the solvent.

8. A method according to claim 7, wherein the solvent is isopropyl alcohol, and wherein the concentration of the antifoaming agent, including any hydrophobic filler, relative to the solvent is in the range of from 10 to 40% by volume.

9. A method according to claim 1, wherein the contact-generating substrate is a polyurethane foam.

10. A device for treating, transporting, or storing blood comprising a porous substrate soaked, coated, or impregnated with an antifoaming agent comprising a dispersion of:

(a) a triglyceride component comprising castor oil;

(b) a hydrophobic filler.

11. A device according to claim 10, wherein the device is a cardiotomy reservoir, venous reservoir, or combined cardiotomy and venous reservoir.

12. A device according to claim 10, wherein the device is a blood filter.

13. A device for treating, transporting, or storing blood comprising a porous substrate soaked, coated, or impregnated with an antifoaming agent comprising a dispersion of:

(a) a triglyceride component comprising ricinoleic acid triglyceride; and (b) a hydrophobic filler.

14. A device of claim 13, wherein the triglyceride component comprises at least 80% by weight of ricinoleic acid triglyceride.

* * * * *

UNITED STATES PATENT AND TRADEMARK OFFICE
CERTIFICATE OF CORRECTION

PATENT NO. : 5,897,548
DATED : April 27, 1999
INVENTOR(S) : Silvio Sacco et al.

It is certified that error appears in the above-identified patent and that said Letters Patent is hereby corrected as shown below:

Column 1,
Line 26, replace "Coring" with -- Corning --.
Line 27, delete the semicolon (;) after "and".

Column 4,
Line 24, replace "rincincoleic" with -- ricinoleic --.
Line 30, replace "phannacopoeia" with -- pharmacopoeia --.
Line 52, replace "alumninum" with -- aluminum --.
Line 60, replace Rm with -- µm --.
Line 63, replace "filter" with -- filler --.

Column 6,
Line 15, replace "Coming" with -- corning --.
Line 36, replace "etracorporeal" with -- extracorporeal --.
Line 51, replace "toxcity" with -- toxicity --.
Line 56, replace "biccompatibility" with -- biocompatibility --.

Column 7,
Line 13, replace "fill" with -- full --.

Column 8, claim 4,
Line 16, after "in", insert -- the --.

Column 8, claim 5,
Line 19, replace "filter" with -- filler --.

Column 8, claim 6,
Line 23, repalce "consist" with -- consists --.

UNITED STATES PATENT AND TRADEMARK OFFICE
CERTIFICATE OF CORRECTION

PATENT NO.    : 5,897,548
DATED         : April 27, 1999
INVENTOR(S)   : Silvio Sacco et al.

It is certified that error appears in the above-identified patent and that said Letters Patent is hereby corrected as shown below:

Column 8, claim 10,
Line 38, after "oil;", insert -- and --.

Signed and Sealed this

Fifth Day of March, 2002

Attest:

JAMES E. ROGAN
Director of the United States Patent and Trademark Office

Attesting Officer